United States Patent [19]

Miller

[11] Patent Number: 4,470,474
[45] Date of Patent: Sep. 11, 1984

[54] LOW RANGE AUTOMATIC WEIGHING DEVICE

[75] Inventor: Walter E. Miller, Milford, Conn.
[73] Assignee: Pitney Bowes Inc., Stamford, Conn.
[21] Appl. No.: 395,777
[22] Filed: Jul. 6, 1982
[51] Int. Cl.³ .......................... G01G 1/38; G01G 1/26
[52] U.S. Cl. .................................. 177/212; 177/248
[58] Field of Search ............................. 177/212, 248
[56] References Cited
U.S. PATENT DOCUMENTS
4,411,328 10/1983 Hubbard .............................. 177/212

Primary Examiner—George H. Miller, Jr.
Attorney, Agent, or Firm—Melvin J. Scolnick; Albert W. Scribner; William D. Soltow, Jr.

[57] ABSTRACT

A weighing device is disclosed which comprises a frame, a pan element for supporting a load to be weighed, a channel member connected to the pan for retaining a plurality of weight elements in a vertically movable manner, a motor supported within the frame, a shaft member operatively connected to and extending from the motor and a plurality of support members having top end portions adapted to receive and lift one of the weight elements. Two arms are secured to the shaft member and each extends in a direction toward the support members. A switch is provided for energizing the motor when the pan is depressed by a load. The motor turns the shaft member and guides each of the arms alternately into contact with successive support members in a step-by-step manner and thereby lift a corresponding number of the weights substantially equal to the weight of the load.

8 Claims, 5 Drawing Figures

U.S. Patent  Sep. 11, 1984  Sheet 1 of 3  4,470,474

LOW RANGE AUTOMATIC WEIGHING DEVICE

BACKGROUND OF THE DISCLOSURE

I. Field of the Invention

This invention relates to weighing devices, and more particularly to low range automatic balance devices having an optical readout system.

II. Description of the Prior Art

Many low range type of scales and balances have been devised and described in the prior art. Many of these devices, however, exhibit numerous problems. A basic disadvantage of a scale as compared to a balance is that scales are sensitive to regional gravitational variations and temperature variations. Several of the low range type of scales and balances described in the prior art do not have the degree of accuracy in weighing that is required in various situations, such as the weighing requirements that exist within the postal field. Furthermore, many of the known weighing devices are not automatic and do not provide for a direct visual readout of the weight of the object being weighed. In addition, many of these devices are relatively complex in design, difficult to manufacture, require the use of high cost materials and are expensive.

One example of a prior art type of low range scale is described in U.S. Pat. No. 2,716,546. The scale illustrated by this patent, when in a rest position, has a plurality of counterweights (balls) supported on a carrier by a spring. When a weight (e.g., a letter) is placed on the weighing pan, the spring extends, thereby successively depositing balls on a plurality of supports which are of different vertical heights so that during the descent of the weighing pan, balls are successively deposited from a shelf onto the supports in a one after the other fashion. A linkage connected to the shelf, and responsive to its vertical height, operates a pointer for indicating the weight on the pan. The scale includes a bimetal strip for compensating for variations in the force of the spring resulting from changes in temperature. The sensitivity of the spring and the required adjusting of each of the counterweights to a particular height are two of the problems related to this type of scale which can alter the accuracy of any weight measurements made thereon. Other examples of scales disclosed by the prior art and relating to the present invention are illustrated in U.S. Pat. Nos. 213,898; 276,701; 1,661,556; 1,944,071; 3,108,647; 4,106,580; and 4,235,296.

In commonly assigned and copending application Ser. No. 361,310, filed Mar. 24, 1982 and entitled "A Low Range Automatic Weighing Device" by D. W. Hubbard there is disclosed a low range automatic balance which overcomes many of the disadvantages of the type of low range weighing devices disclosed in the prior art. Basically, this device comprises a frame, a pan element for supporting a load to be weighed, a channel member connected to the pan for retaining a plurality of weight elements in a vertically movable manner, a motor supported within the frame and a shaft member operatively connected to and extending from the motor and supporting the pan element. A plurality of support members are provided that have top end portions adapted to receive and lift one of the weight elements. A camming arm is secured to the shaft member and extends in a direction toward the support members. A switch is provided for energizing the motor when the pan is depressed by a load. The motor turns the shaft member and guides the camming arm into contact with successive support members in a step-by-step manner to place a number of the support members in an extended position and lift a corresponding number of the weights substantially equal to the weight of the load. Because of the order in which the weight elements are positioned on the pan it is possible that this can result in a slight uneven weight distribution on the pan. This can tend to increase the friction between the motor shaft and the pan.

Alternate type of weighing devices which have resolved the above-described type of problems are described in my commonly assigned and copending application Ser. No. 395,775, filed July 6, 1982 and Ser. No. 395,776, filed July 6, 1982, both entitled "Low Range Automatic Weighing Device".

SUMMARY OF THE INVENTION

It is therefore a primary object of the present invention to overcome many of the disadvantages of the type of low range weighing devices disclosed in the prior art and provide a balance which is highly efficient.

It is a further object of the present invention to provide a low range automatic balance which is highly sensitive and highly accurate in its weight measurements.

It is a further object of the present invention to provide a low range automatic balance which has particular use in the postal field and which features a direct visual readout of the weight of the object being weighed.

It is still a further object of the present invention to provide a balance which is relatively simple in design, easy to manufacture, uses low cost materials in its construction and is relatively inexpensive.

The foregoing objects and others are accomplished in accordance with the present invention by providing a weighing device comprising: a frame, a pan element for supporting a load to be weighed, means connected to said pan for retaining a plurality of weight elements in a vertically movable manner, a motor supported within the frame, a shaft member operatively connected to and extending from the motor and supporting the pan element and a plurality of support members each having top end portions adapted to receive and lift one of the weight elements. First and second arms are secured to the shaft member and each of these arms extend in a direction toward the support members. A switching means is provided for energizing the motor when the pan is depressed by a weighted load, the motor turning the shaft member and guiding the first and second arms alternately into contact with successive support members in a step-by-step manner and thereby lift a corresponding number of the weights equal to the weight of the load.

BRIEF DESCRIPTION OF THE DRAWINGS

For a better understanding of the invention, as well as other objects and further features thereof, reference is made to the following detailed description of this invention taken in conjunction with the accompanying drawings wherein.

DESCRIPTION OF THE PREFERRED EMBODIMENTS

Figure 1:
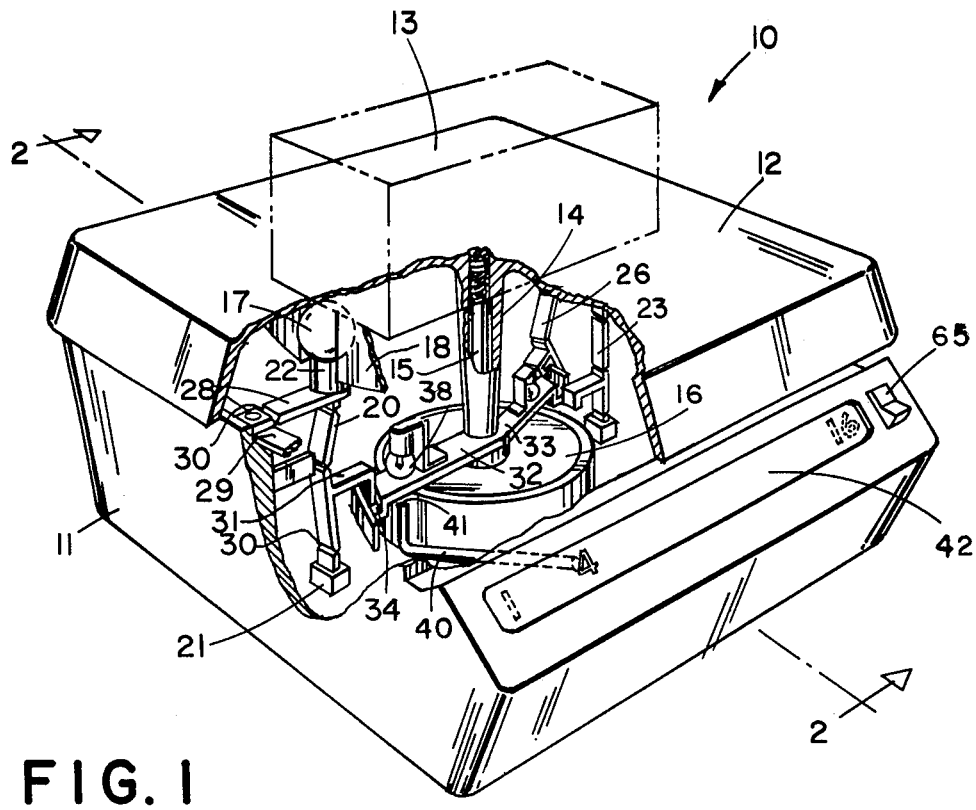
FIG. 1 is a perspective view, partly in section, of a balance in accordance with the features of the present invention.
Figure 2:
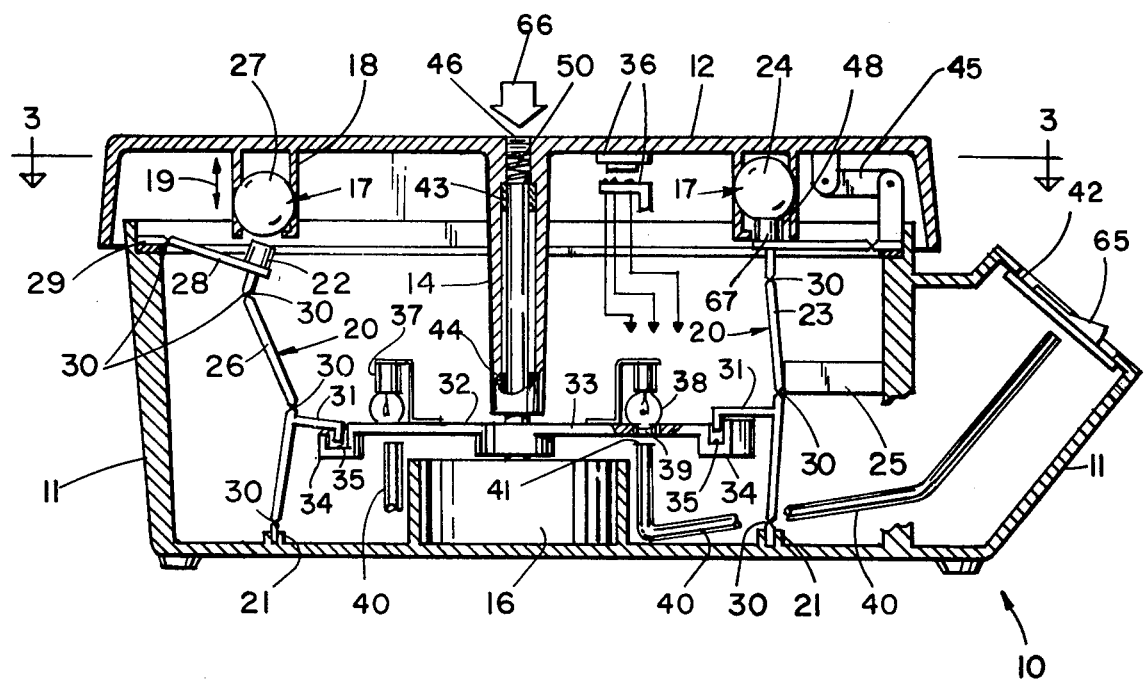
FIG. 2 is a longitudinal sectional view taken along line 2—2 of FIG. 1.
Figure 3:
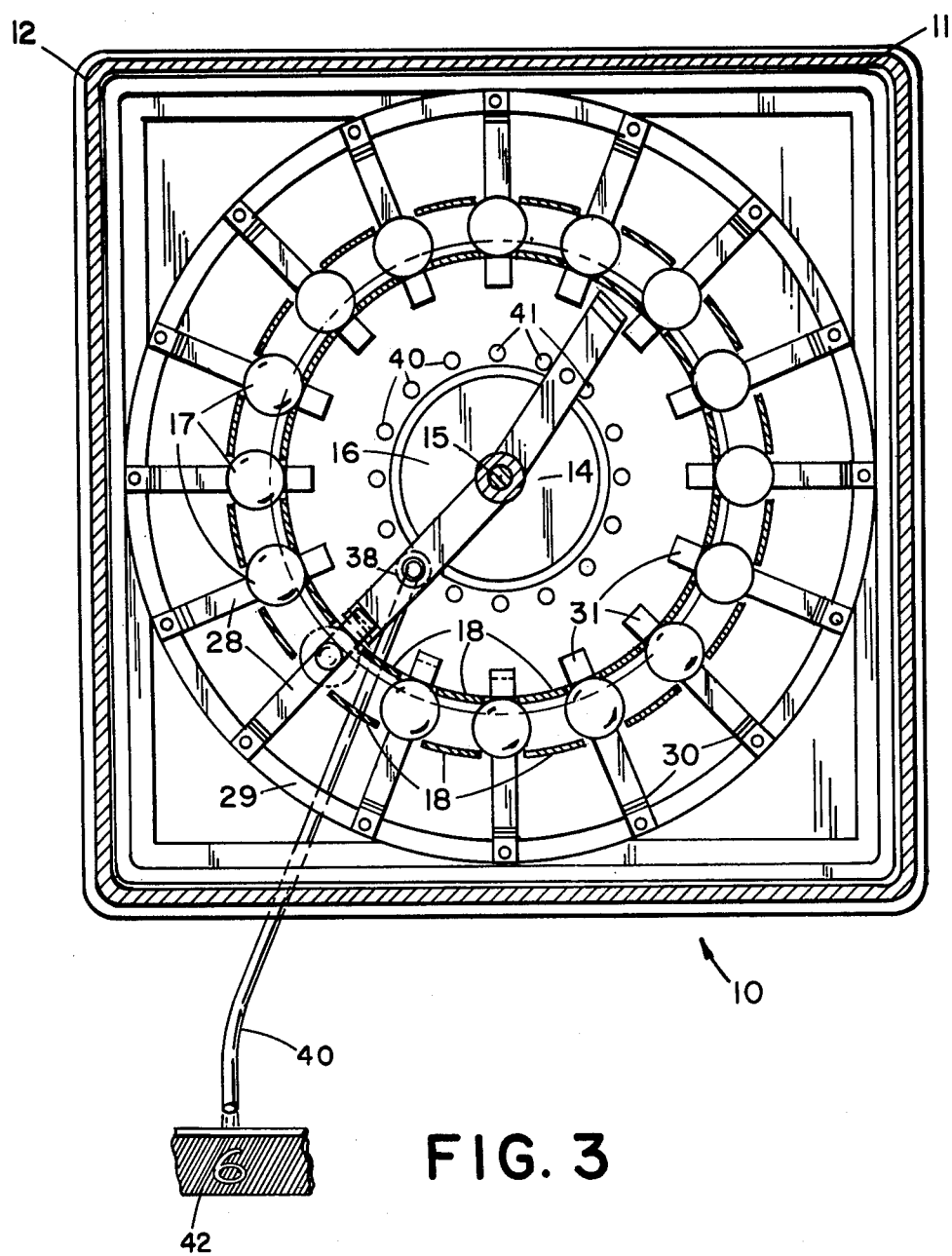
FIG. 3 is a top sectional view taken along line 3—3 of FIG. 2.

Referring now to the drawings, and particularly to FIGS. 1 and 2, there is shown an embodiment of a weighing device (balance) in accordance with the preferred features of the present invention. The weighing device (balance) 10 includes frame 11 encasing the components thereof. The balance includes a pan element or weighing pan 12 used for supporting a load 13 that is to be weighed by the balance. Preferably extending from the bottom portion of pan 12 is a hollow shaft member 14. The weighing pan is supported by a shaft member 15 that lies within hollow shaft member 14. Shaft member 15 is operatively connected to and extends from a motor 16. The pan includes and supports a plurality of weight elements, preferably in the form of balls 17, that are retained in a ball retaining ring 18 that encircles the bottom portion of the pan in a closed path (see FIG. 3). Ball retaining ring 18 extends down from the bottom portion of pan 12 preferably in the form of a U-shaped channel member. Each of balls 17 are retained in the retaining ring in a manner which permits each of the balls to move vertically as shown by arrow 19.

There is shown in FIG. 2 an embodiment for a support member configuration in accordance with the present invention. As shown, a plurality of collapsible support members 20 are arranged in the frame. In accordance with a preferred embodiment of the present invention these support members can be arranged in a concentric path. In accordance with the specific example of a balance described hereinbelow, sixteen support members are arranged in a circular path, i.e. support members are positioned at about 22½ degree intervals. Each of the support members are secured at one end to frame 11 to a support ring 29, and each have at their opposite end portions means that is adapted to receive and lift one of the balls 17. This means can be, for example, in the form of a cup-like element 22. The support members are secured to the frame in a manner which positions a cup-like element directly under the vertical path of travel of each of the balls 17. Thus, there is one support member 20 for each ball 17. Each cup-like element 22 is adapted to receive and lift one of the weight elements (balls) when the corresponding support member supporting the cup-like element is in an extended and non-collapsed position as exemplified by support member 23 and ball 24. When in this position each of the support members 20 has a corresponding stop element 25 upon which the support member rests and is prevented from collapsing. Note, support member 26 which is an example of a support member in a collapsed position with the corresponding ball 27 being supported by the ball retaining ring 18. Secured to each of the support members, forming a part thereof, and positioned below each of the cup-like elements 22 is a stabilizing arm member 28 the function of which is to keep each of the cup-like elements in place and centered under each of balls 17. Each of these stabilizing arm members is secured to a ring member 29 that is in turn secured to frame 11. Each of support members 20 preferably include four flexure hinge points 30 which enable the support members to bend, flex, collapse and thereby function as required in accordance with the present invention. Each of the support members also include an arm member 31 extending therefrom. The function of arm member 31 is explained in detail hereinbelow. The support member (including stabilizing arm 28, arm member 31 and cup-like element 22) can be formed of one molded piece of plastic wherein each of the flexure hinge points 30 would be formed by a reduced cross section within the mold.

Secured to shaft member 15 are first and second arms, preferably in the form of a first camming arm 32 and a second camming arm 33, both being positioned to extend in a direction toward the collapsible support members 20. The camming arms are secured to and rotate with shaft member 15. One preferred embodiment for camming arms 32 and 33 includes a dish-like element 34 projecting from the end portions of each of the camming arms. The dish-like element includes an open portion with a cam surface 35 which is adapted to receive arm members 31. In operation, as camming arms 32 and 33 are rotated by motor 16 about a closed path, the arm members 31 in a collapsed position (see support member 26) are engaged by the cam surface 35 and pushed in a manner which lifts the support members to an extended and non-collapsed position (see support member 23). To provide a more even weight distribution on pan 12 (i.e., a more even weight distribution of weight elements 17 on the pan) and thereby reduce the friction between hollow shaft member 14 and the motor shaft 15 during operation of the balance, the two camming arms 32 and 33 are positioned on shaft 15 to travel in a manner whereby the arms alternately lift weight elements 17. It is preferred in accordance with the present invention that the arms travel in two different sectors and that each camming arm travel through a sector of about 180 degrees and in accordance with the specific example given herein, alternately lift eight of the balls 17.

A switch 36 is electrically connected to motor 16 and energizes the motor when pan 12 is depressed by a load 13 in the manner as more fully described hereinbelow. The switch is preferably a double pole type electrical displacement switch having one portion thereof mounted on the bottom portion of pan 12 (see FIG. 2).

Balance 10 includes a read-out system for visually displaying the weight of the load. This system can include, for example, lamps 37 and 38 secured to each of camming arms 32 and 33 so that the lamps revolve along with the camming arms. Located directly under each of lamps 37 and 38 is an opening 39 which permits light to be projected from lamp 37 and 38 to any of a plurality of light pipes 40 as camming arms 32 and 33 rotate around their respective paths of travel. One end portion 41 of each of the light pipes are arranged about a path positioned directly under the closed path of travel of lamps 37 and 38 (see FIG. 3). Each of the other end portions of each of the light pipes is positioned by a number on display panel 42 that corresponds to the different measurements of weight.

The primary function of motor 16 is to turn shaft member 15 and thereby guide camming arms 32 and 33 about a path alternately into contact with successive collapsed support members 20 (or away from extended support members when the motor operates in reverse in the manner as described hereinbelow) in a step-by-step manner, i.e. a motor capable of moving one pole position for every input pulse. Examples of the type of motors that can be used to accomplish this function include a stepping motor or a DC servo motor with a shaft encoder. The invention will hereinafter be described using a stepping motor for illustrative purposes. In accordance with the present invention any conventional stepping motor can be used. With a sixteen division scale (one using sixteen weight elements (balls) 17), the number of poles on the stepping motor would be selected to be a multiple of sixteen so that the poles would then determine the intermediate stopping points at each of the positions where a ball is located and is to be lifted or lowered. A thirty-two (32) pole stepping motor would be used in accordance with the example described herein such that camming arms 32 and 33 would have intermediate stopping points about every 11¼ degrees. In order for the camming arms to alternately lift support members 20, the arms are positioned on shaft member 15 such that when camming arm 32 is positioned at a support member 20 in its sector, camming arm 33 is positioned between two support members 20 or about 11¼ degrees away from a support member in its sector of travel.

As illustrated in FIG. 2, pan 12 is supported on shaft member 15 in a manner which enables the pan to float on the shaft member by spring 50. The pan lies on the spring in such a manner whereby it can move vertically (float) on shaft member 15. Preferably two bearings 43 and 44 are provided between shaft member 15 and the inside surface of hollow shaft member 14 which permit the shaft member to freely rotate within the hollow shaft member and also allow pan 12 to move freely in a vertical direction on shaft member 14. Also provided is a means to prevent any rotational movement of pan 12 without interferring with the vertical movement of the pan. This can be accomplished by the use of a freely pivoting linkage device 45 secured at one end to the pan and at the other end to frame 11.

There are several types of systems that can be used with the balance of the present invention to permit one to "zero" the balance. For example, illustrated in FIG. 2 is an adjusting screw 46 which permits one to "zero" the balance. With no weight on pan 12, the pan will settle to a certain position on spring 50. The adjusting screw is employed to raise or lower the pan so that it can be brought to the position that with no weight thereon, the two poles of switch 36 will not touch but will lie in contiguous relation and thus all of the support members 20 will be in a collapsed position with all of balls 17 being supported within ball retaining ring 18.

Figure 4:
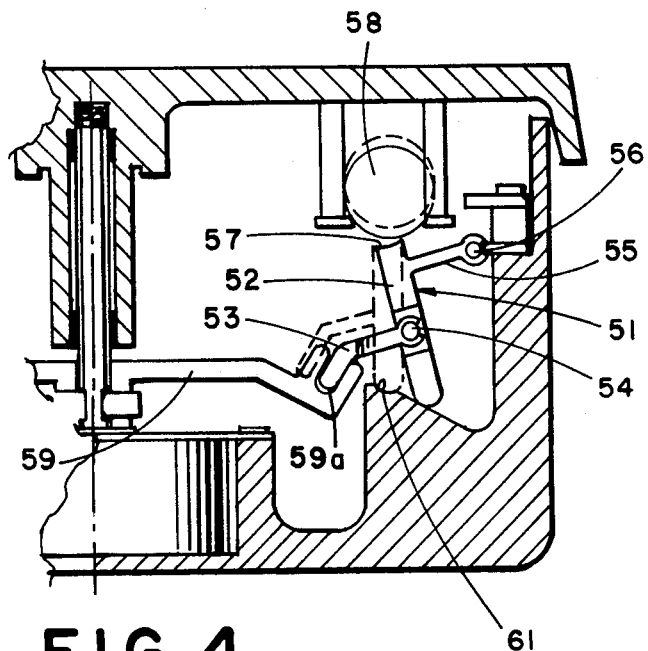
FIG. 4 is a longitudinal sectional view illustrating a further embodiment of a support member in accordance with the features of the present invention.

There is illustrated in FIG. 4 another embodiment for a support member configuration in accordance with the present invention. As shown, support member 51 includes leg member 52, a flexible arm 53 that pivots at one end on the leg member at 54, and a rigid arm 55 extending from the leg member that is pivotedly connected at its end portion 56 to frame 11. The top portion of leg member 52 includes a curved surface 57 which enables the support member 51 to lift and support ball (weight element) 58. In operation when a weight is placed on the pan, camming arm 59 makes contact with collapsed support member 51, flexible arm 53 is engaged by cam surface 59(a) and the support member is placed in an extended and non-collapsed position as shown by the dotted lines. The support member is kept in this extended position by allowing the bottom portion of leg member 52 to rest in groove 61. When a weight is removed from the pan, camming arm 59 travels in the reverse direction. Flexible arm 53 is once again engaged by cam surface 59(a) and support member 51 is pushed back to its original position (solid lines).

The balance in accordance with the present invention has particular use as a low range automatic balance in the postal field. Although the balance described herein is for measuring the weight of objects of less than or equal to one pound, it is to be noted that low range balances in accordance herewith can include balances for measuring objects, practically speaking, up to about four pounds. A one pound balance in accordance with the features of the present invention would employ sixteen one ounce balls (weight elements) each made of some dense material, preferably steel, and each being accurately machined to a precise diameter, and thus a precise weight of one ounce. The entire balance has a primary overall advantage that it can be constructed very inexpensively by being made out of different plastic materials. This would include such parts as, for example, frame 11, support members 20, pan 12, shaft member 15, etc.

In operation, a user would start using balance 10 by first turning on the on/off switch 65 which allows electrical current to flow to the balance. With no weight on pan 12, all of the sixteen support members 20 would be in a collapsed position. See support member 26 in FIG. 2. All of the corresponding balls would be resting within the confines of the ball retaining ring 18 as illustrated by ball 27. When a weight is placed on pan 12 as designated by arrow 66, the pan descends vertically causing the two poles of switch 36 to make contact. Since the switch is electrically connected to stepping motor 16, placing a weight on the pan energizes the stepping motor which starts shaft member 15 rotating thereby rotating camming arms 32 and 33 about their respective paths. For a postal balance, any weight placed on pan 12 that weighs up to and including one ounce will display a one ounce reading on display panel 42. Thus, when any weight less than or equal to one ounce is placed on the pan, the stepping motor will cause camming arm 32 to move a distance about a circular path of about 11¼ degrees to the first collapsed support member where the camming surface 35 of the camming arm will connect with the arm of the support member located in the first position thereby lifting this support member to a non-collapsed and extended position. As shown in FIG. 2, when this motion occurs, cup-like element 22 is pushed through opening 67 in the bottom portion of the U-shaped channel ball retaining ring 18 and lifts ball 24 vertically so that it no longer rests within the ball retaining ring.

Figure 5:
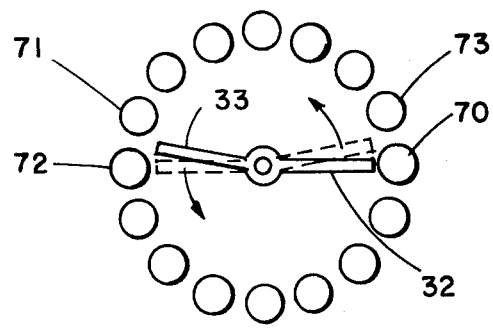
FIG. 5 is a top diagramical view illustrating the path of travel of the camming arms in accordance with the present invention.

As shown in FIG. 5, at the same time that camming arm 32 is in contact with the support member under ball 70 (the first collapsed support member) camming arm 33 is positioned within its sector midway between support members under balls 71 and 72 (i.e., about 11¼ degrees from each support member). To provide a more even weight distribution on pan 12 during operation of the scale, camming arm 33 is positioned to operate alternately on those support members that are located diametrically across from the support members that camming arm 32 operates on. At this point in the weighing operation, pan 12 would be in equilibrium with the weight thereon thereby allowing the pan to float on spring 50 to its original position (i.e. the position of the pan without a weight thereon) causing the poles of switch 36 to open, thereby stopping stepping motor 16. The light from light source 37 would project through opening 39 in the camming arm to the corresponding light pipe whose end portion is positioned thereby. Thus, that part of display panel 42 that shows the number 1 (representing a one ounce weight) would light up.

If, for example, the initial weight placed on pan 12 weighed over one ounce, but less than or equal to two ounces, then after camming arm 32 caused the lifting of the first ball, the stepping motor would cause camming arms 32 and 33 to rotate on shaft 15 an additional $11\frac{1}{4}$ degrees thereby placing camming arm 32 about midway between the support members under balls 70 and 73 and camming arm 33 would be positioned at and lifting support member under ball 72 (see FIG. 5). Thus, as described above, the second ball would be lifted off ball retaining ring 18 and light source 38 would then be positioned over the corresponding light pipe representing a two ounce weight which would light as two ounces on the display panel. Whenever a sufficent number of balls (up to 16) representing the total weight of the object on the pan (up to a total of 16 ounces) have been lifted off of the ball retaining ring, spring 50 returns to its original position (its position without any weight) which causes the poles of switch 36 to open and power to be removed from the stepping motor so that it stops rotating. At that point a light will be positioned over a light pipe that corresponds to the amount of weight on the pan. In turn, the light pipe conducts light to display screen 42 located on the front portion of the base of the balance correspondingly lighting up a number on the display screen equivalent to the number of balls that have been removed from the ball retaining ring.

When the object being weighed is removed from the balance, pan 12 moves vertically upwards on spring 50 such that the second pole of double pole switch 36 is closed. This causes stepping motor 16 to rotate in a reverse direction thereby causing shaft member 15 and camming arms 32 and 33 to rotate about their same paths, but in a reverse direction. Thus, if the entire object being weighed is removed from the pan, the cam surfaces 35 of camming arms 32 and 33 travel in a reverse direction (i.e. travel at about $11\frac{1}{4}$ degree movements in each of their respective sectors) about their paths and alternately contact each of the arm members 31. The support members 20 which are in an extended and non-collapsed position, are then each successively pulled back down to a collapsed position and each of the balls 17 are lowered back down into the ball retaining ring unit 18 in an alternate manner corresponding to the format followed when the balls were removed from the ring unit, but in a reverse manner. The balance mechanism returns to the neutral position which is the zero position if the weight is completely removed from the pan.

The balance in accordance with the features of the present invention is constructed so as to be substantially insensitive to various load shifts or eccentric loads which occur, for example, when the item to be weighed is placed on a corner or an edge of pan 12. The drive mechanism of motor 16 is such that shaft member 15 oscillates slightly about any one of the pole positions of the motor. When, for example, the motor is a stepping motor, the oscillations are made by shaping the current pulses (e.g., reducing the voltage amplitude and/or duration) to having a continual oscillation. This oscillation, which will impart a relatively small rotational relative movement between the supporting shaft 15 and bearings 43 and 44 will allow the pan to adjust axially on the shaft so that any frictional hysterisis will be substantially eliminated.

While this invention has been described in conjunction with specific embodiments thereof, it is evident that many alternatives, modifications and variations will be apparent to those skilled in the art. Accordingly, the present invention is intended to embrace all such alternatives, modifications and variations and fall within the spirit and scope of the appended claims.

I claim:

1. A weighing device comprising:
   a frame;
   a pan element for supporting a load to be weighed;
   means connected to said pan for retaining a plurality of weight elements in a vertically movable manner;
   a motor supported within said frame;
   a shaft member operatively connected to and extending from said motor and supporting said pan element;
   a plurality of support members each having top end portions adapted to receive and lift one of said weight elements;
   first and second arms, each secured to said shaft member and each extending in a direction toward said support members; and
   switching means for energizing said motor when said pan is depressed by a weighted load said motor turning said shaft member and guiding said first and second arms alternately into contact with successive support members in a step-by-step manner to alternately raise said weight elements diametrically across from each other and thereby lift a corresponding number of said weights substantially equal to the weight of said load.

2. A weighing device comprising:
   a frame;
   a pan element for supporting a load to be weighed;
   means connected to said pan for retaining a plurality of weight elements in a vertically movable manner;
   a motor supported within said frame;
   a shaft member operatively connected to and extending from said motor and supporting said pan element;
   a plurality of support members each having top end portions adapted to receive and lift one of said weight elements;
   first and second camming arms, each secured to said shaft member and each extending in a direction toward said support members; and
   switching means for energizing said motor when said pan is depressed by a weighted load said motor turning said shaft member and guiding said first and second camming arms alternately into contact with successive support members in a step-by-step manner to alternately raise said weight elements diametrically across from each other and thereby lift a corresponding number of said weights substantially equal to the weight of said load.

3. A weighing device according to claim 2 wherein said first camming arm is guided into contact with support members positioned in a first sector while said second camming arm is alternately guided into contact with support members positioned in a second sector.

4. A weighing device according to claim 3 wherein each of said sectors is about 180 degrees.

5. A weighing device according to claim 2 wherein said motor is a stepping motor.

6. A weighing device according to claim 2 wherein said weight elements comprises sixteen elements, each of said elements weighing about one ounce.

7. A weighing device according to claim 2 further comprising read-out means for visually displaying the weight of said load.

8. A weighing device comprising:
a frame;
a pan element for supporting a load to be weighed;
means connected to said pan for retaining a plurality of weight elements in a vertically movable manner;
a motor supported within said frame;
a shaft member operatively connected to and extending from said motor and supporting said pan element;
a plurality of collapsible support members; each of said support members secured at one end thereof to said frame and each having top end portions adapted to receive and lift one of said weight elements when said member is in an extended and non-collapsed position;
first and second camming arms, each secured to said shaft member and each extending in a direction toward said support members; and
switching means for energizing said motor when said pan is depressed by a weighted load said motor turning said shaft member and guiding said first and second camming arms alternately into contact with successive collapsed support members in a step-by-step manner to place a number of said support members in a non-collapsed position to alternately raise said weight elements diametrically across from each other and thereby lift a corresponding number of said weights substantially equal to the weight of said load.

* * * * *